United States Patent
Nava et al.

(10) Patent No.: US 11,947,855 B2
(45) Date of Patent: Apr. 2, 2024

(54) METHOD AND SYSTEM FOR TRANSMITTING AT LEAST ONE MESSAGE BY MEANS OF A TIMEPIECE

(71) Applicant: Montres Rado SA, Lengnau (CH)

(72) Inventors: Sergio Nava, Lecco (IT); Daniele Fumagalli, Bosisio Parini (IT); Lorenzo Ronzoni, Seveso (IT)

(73) Assignee: Montres Rado SA, Lengnau (CH)

( * ) Notice: Subject to any disclaimer, the term of this patent is extended or adjusted under 35 U.S.C. 154(b) by 334 days.

(21) Appl. No.: 17/415,788

(22) PCT Filed: Dec. 20, 2019

(86) PCT No.: PCT/EP2019/086785
§ 371 (c)(1),
(2) Date: Jun. 18, 2021

(87) PCT Pub. No.: WO2020/128035
PCT Pub. Date: Jun. 25, 2020

(65) Prior Publication Data
US 2022/0147294 A1    May 12, 2022

(30) Foreign Application Priority Data
Dec. 21, 2018 (EP) ..................... 18215635

(51) Int. Cl.
*G06F 3/12* (2006.01)
(52) U.S. Cl.
CPC .......... *G06F 3/1285* (2013.01); *G06F 3/1215* (2013.01); *G06F 3/1231* (2013.01); *G06F 3/1295* (2013.01)
(58) Field of Classification Search
None
See application file for complete search history.

(56) References Cited

U.S. PATENT DOCUMENTS

| | | | | |
|---|---|---|---|---|
| 2012/0192424 A1* | 8/2012 | Cataldo | ................. | B33Y 50/02 29/896.33 |
| 2015/0362893 A1* | 12/2015 | Masserot | ................. | G04G 5/00 368/4 |
| 2018/0248874 A1 | 8/2018 | Hanada et al. | | |

FOREIGN PATENT DOCUMENTS

| | | | |
|---|---|---|---|
| CH | 714481 A2 * | 6/2019 | |
| CN | 104345635 A | 2/2015 | |
| | (Continued) | | |

OTHER PUBLICATIONS

International Search Report dated Apr. 3, 2020 in PCT/EP2019/086785 filed Dec. 20, 2019, 2 pages.

(Continued)

*Primary Examiner* — Chris Parry
*Assistant Examiner* — Abderrahmen Chouat
(74) *Attorney, Agent, or Firm* — Oblon, McClelland, Maier & Neustadt, L.L.P.

(57) ABSTRACT

A method for transmitting a message between a first electronic device of a first user and a second electronic device of a second user via a timepiece includes: creating the message to be transmitted by the first electronic device; storing the created message on a remote server and/or in the first electronic device as digital message data; generating a digital graphic representation for the transmission of the message by the remote server and/or by the first electronic device; building a figurative representation pertaining to the digital graphic representation for the transmission of the message on all or a portion of the timepiece by a visual element building device controlled by the server; and transmitting the message by the second electronic device from a digital figurative representation emanating from the capture of the figurative representation included on all or a portion of the timepiece, by this second electronic device.

16 Claims, 1 Drawing Sheet

(56) References Cited

FOREIGN PATENT DOCUMENTS

| CN | 106164959 | A |   | 11/2016 |     |         |
|----|-----------|---|---|---------|-----|---------|
| CN | 107077809 | A |   | 8/2017  |     |         |
| CN | 107404503 | A |   | 11/2017 |     |         |
| CN | 108353256 | A |   | 7/2018  |     |         |
| CN | 108520305 | A |   | 9/2018  |     |         |
| CN | 108700986 | A |   | 10/2018 |     |         |
| JP | 2000020589 | A | * | 1/2000 | ............... | G04D 3/00 |
| JP | 2003248708 | A | * | 9/2003 |     |         |

OTHER PUBLICATIONS

Combined Office Action and Search Report dated Aug. 10, 2022 in Chinese Patent Application No. 201980085026.1, 8 pages.

* cited by examiner

METHOD AND SYSTEM FOR TRANSMITTING AT LEAST ONE MESSAGE BY MEANS OF A TIMEPIECE

CROSS-REFERENCE TO RELATED APPLICATION

The present application is a national stage application of PCT Application No: PCT/EP2019/086785, filed Dec. 20, 2019, which claims priority to European Patent Application No. 18215635.6, filed Dec. 21, 2018. The benefit of priority is claimed to each of the foregoing, and the entire contents of each of the foregoing are incorporated herein by reference.

FIELD OF THE INVENTION

The invention relates to a method for transmitting at least one message by means of a timepiece on a system implementing such a method.

The invention also relates to a computer programme comprising programme code instructions for executing the steps of this method.

BACKGROUND OF THE INVENTION

In the prior art, various methods are involved in the transmission of a message by means of a timepiece. For example, there are known methods consisting in printing such a message on a part of the timepiece, such as the bracelet, so that the wearer for whom the message is intended becomes aware of the message, as long as the wearer is in possession of the timepiece. There are also other known methods aimed at transmitting the message by means of a screen included in a component part of the timepiece, such as the dial, said methods implementing, for the transmission of said message, telecommunication technologies for communicating between a remote server and said timepiece provided with said screen.

However, such methods have a major drawback associated with security and confidentiality in the transmission of such a message. Indeed, individuals other than the wearer of the timepiece may also become aware of the message if they are in possession of the timepiece.

SUMMARY OF THE INVENTION

One of the purposes of this invention is to overcome all or a portion of the drawbacks mentioned above, by providing a method and a system ensuring optimum confidentiality and security as part of the transmission of a message by means of a timepiece.

To that end, the invention relates to a method for transmitting at least one message between a first electronic device and a first user, and a second electronic device of a second user by means of a timepiece, comprising the following steps:
  creation of the message to be transmitted by the first electronic device of the first user;
  storage of said created message on a remote server and/or in said first electronic device in the form of digital message data;
  generation of a digital graphic representation for the transmission of said message by the remote server and/or by said first electronic device (3a);
  building of a figurative representation pertaining to said digital graphic representation for the transmission of said message on all or a portion of the timepiece by a visual element building device controlled by the server;
  transmission of said message by the second electronic device of the second user from a digital figurative representation emanating from the capture of said figurative representation included on all or a portion of the timepiece, by this second electronic device.

Thus, thanks to these features, the message is then only made accessible from the figurative representation which comprises or constitutes an identifier of the message, said identifier consequently being included on/in the display area of the timepiece for a secure and confidential transmission of the message to the wearer of the timepiece from an electronic device in the wearer's possession.

In other embodiments:
  the generation step comprises a sub-step for selecting, through a man-machine interface of the first electronic device, a digital visual representation model from among various models displayed on a display module of said first electronic device;
  the generation step comprises a sub-step for applying modification criteria to at least one descriptive parameter of the selected digital visual representation;
  the transmission step comprises a sub-step for digitizing the figurative representation made on/in the display area from the second electronic device;
  the transmission step comprises a sub-step for identifying the message to be transmitted;
  the transmission step comprises a sub-step for transmitting digital message data pertaining to said identified message to the second electronic device;
  the building step comprises a sub-step for generating, by means of a control unit of the server, at least one control instruction for controlling a device for building said graphic representation as a function of the descriptive characteristics of the digital graphic representation for transmission;
  the building step comprises a sub-step for building the graphic representation on/in the display area, said sub-step implementing a process of material removal in this display area and/or a process of depositing at least one layer of material on this display area;
  the method comprises a step for timepiece building comprising a sub-step for assembling a set of components constituting said timepiece to which said at least one component comprising the display area provided with the graphic representation belongs;
  the display area is defined on a single component of the timepiece, namely a dial of the timepiece;
  the display area is defined on several separate components of the timepiece;
  said at least one message is an audio and/or video or graphical message,
  the figurative representation is two-dimensional or three-dimensional.

The invention also relates to a system for transmitting at least one message between a first electronic device of a first user and a second electronic device of a second user by means of a timepiece implementing such a method, the system comprising the first and second electronic devices, a server including a database provided with at least one digital graphic representation model, and a visual element building device on/in a display area of the message defined on all or a portion of the timepiece, the first and second electronic devices and the building device being connected to said server.

The invention also relates to a timepiece capable of being included in such a system, including a display area of the message provided with a figurative representation comprising an identifier of the message.

The invention further relates to a computer programme comprising programme code instructions for running steps of the method when said programme is executed by control and processing units of the server and the first and second electronic devices, respectively.

BRIEF DESCRIPTION OF THE DRAWINGS

Other particularities and advantages will become clear from the description given below, as non-limiting examples, in reference to the appended drawings, in which.

DETAILED DESCRIPTION OF THE PREFERRED EMBODIMENTS

Figure 1:
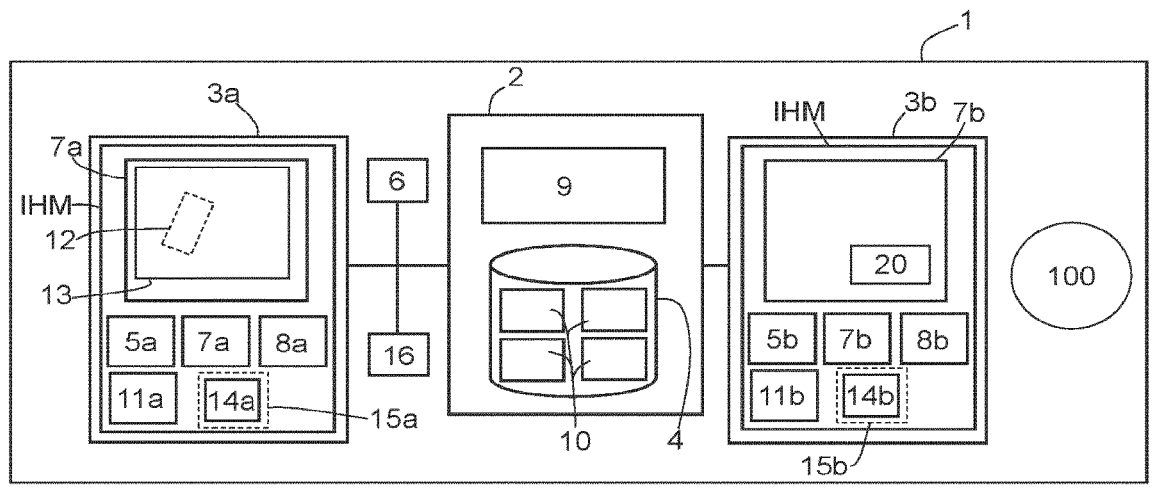
FIG. 1 is a representation of a system for transmitting at least one message between a first electronic device and a first user and a second electronic device of a second user by means of a timepiece, according to one embodiment of the invention.

In reference to FIG. 1, transmission system 1 for transmitting at least one message by means of a timepiece 100 comprises:

first and second electronic devices 3a and 3b;
a remote server 2 including a database 4 provided with a plurality of digital visual representation models 10 and of descriptive parameters associated with each model 10;
a building device 6 for building visual elements of timepieces 100, otherwise referred to as a building device 6 for building figurative representations on timepieces 100, these visual elements/figurative representations being capable of being in two or three dimensions, and
a wireless or wired network architecture connecting first and second electronic devices 3a, 3b and remote server 2 together, as well as this server 2 to building device 6.

Figure 3:
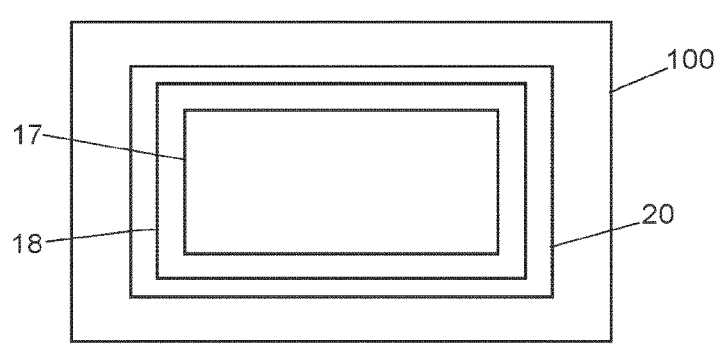
FIG. 3 shows the timepiece that is capable of participating in the transmission of said at least one message, according to the embodiment of the invention.

Such a system 1 thus allows a first user of this system 1 to transmit a message made from first electronic device 3a to a second user wearing the timepiece. Such a message is sent by second electronic device 3b of the second user by being made accessible from a figurative representation 17 present on all or a portion of timepiece 100. Such a timepiece 100 shown in FIG. 3, may be a timepiece 100 for the transmission of at least one message, or a timepiece 100 capable of participating in the transmission of said at least one message.

In this system 1, this server 2 therefore comprises database 4, a control unit 9, and a communication unit. As we have mentioned earlier, this server 2 comprises a plurality of digital graphic representation models 10. Each digital visual representation model 10 may be a two-dimensional (2D) or a three-dimensional (3D) digital graphic representation. This digital visual representation model 10 can be generated by a design module of system 1, which is connected to control unit 9 of server 2, which may comprise a two-dimensional/three-dimensional digitization device. This model 10 can also be generated by a software tool executed by control unit 9, such a tool enabling virtual modelling from photographs, images, or objects, or making it possible to design a virtual digital object (for example, computer-assisted design software better known by the acronym CAD).

As we have mentioned earlier, each digital visual representation model 10 is associated with descriptive parameters. These descriptive parameters define in particular the appearance/visual portrayal of digital visual representation model 10. In this context, these descriptive parameters comprise in a non-limiting and non-exhaustive way:

a shape of the two-dimensional and/or three-dimensional graphic object or objects constituting digital graphic representation 10, this shape being capable of being a geometric shape such as a circle, sphere, ellipse, cone, cylinder, truncated cone, triangle, polyhedron, a combination of at least two different or similar geometric shapes, etc.;
dimensions of two-dimensional and/or three-dimensional graphic objects constituting digital visual representation model 10, these dimensions being able to correspond to a thickness, width, length, depth, surface, volume, etc.;
one or more colours constituting each two-dimensional and/or three-dimensional graphic object;
a texture constituting the surface or surfaces of each two-dimensional and/or three-dimensional graphic object;
a relative position of the two-dimensional and/or three-dimensional graphic objects in relation to each other when digital visual representation model 10 comprises a plurality of these objects.

In this server 2, control unit 9 comprises hardware and software resources, in particular at least one processor cooperating with memory components. This control unit 9 is capable of executing instructions for implementing a computer programme aimed at, for example, managing database 4 of server 2, controlling building device 6, and/or processing the queries/instructions/data coming/sent to/from first and second electronic devices 3a, 3b, particularly to/from processing unit 5a, 5b thereof.

Note that control unit 9 is connected to building device 6 and first and second electronic devices 3a, 3b by means of the communication unit of server 2. Such a communication unit is capable of implementing secure communication protocols within the network architecture of this system 1.

In this system 1, first and second electronic devices 3a, 3b can be, for example, a computer, a smartphone, a tablet, or an electronic terminal. Each of such first and second electronic devices 3a, 3b comprises in a non-limiting or non-exhaustive way:

processing unit 5a, 5b including hardware and software resources, in particular at least one processor cooperating with memory components;
a display module 7a, 7b such as a screen shown in FIG. 1 displaying a visual representation of information data 13;
an interface for audio information transmission, such as a loudspeaker;
a communication interface for establishing a communication link between processing unit 5a, 5b and control unit 9 of server 2 for data exchanges;
a selection interface 8a, 8b such as a keyboard or a tactile interface included in display module 7a, 7b, for example, at least one audio stream capture module 11a, 11b comprising at least one microphone;

at least one light stream capture module 14a, 14b also called a capture module for capturing at least one image, comprising in particular an image sensor of the CCD (for "Charge-Coupled Device") matrix sensor type, or the CMOS ("Complementary Metal-Oxide-Semiconductor") matrix sensor type, for example a digitization module 15a, 15b also referred to as a scanning module, which can comprise said at least one light stream capture module 14a, 14b, and a man-machine interface MMI.

In each of these electronic devices 3a, 3b, processing unit 5a, 5b is connected, among other things, to display module 7a, 7b, to the transmission interface, to the communication interface, to selection interface 8a, 8b, and to man-machine interface MMI. This processing unit 5a, 5b is capable in particular of executing instructions for implementing the computer programme aimed at processing, for example, the queries/instructions/data being received/sent:

to/from server 2, particularly to/from control unit 9 thereof, and/or to/from man-machine interface MMI.

Man-machine interface MMI of each of these two electronic devices 3a, 3b comprises processing unit 5a, 5b, display module 7a, 7b, light and audio stream capture modules 14a, 14b, 11a, 11b, and selection interface 8a, 8b through which a user of electronic device 3 can act. In particular, with regard to first electronic device 3a, but not exclusively, man-machine interface MMI comprises any technical and cognitive means involved from generation of the visual representation of information data 13 containing in particular information pertaining to digital visual representation models 10 stored in database 4 of server 2 for the purpose of the display thereof on display module 7a, up to a selection, first of one of digital visual representation models 10 from selection interface 8a of first electronic device 3a, and then a creation of a digital graphic representation for transmission 12 emanating from the processing of said at least one message and from digital visual representation model 10. In this context, this digital graphic representation for transmission 12 serves as a basis for creating figurative representation 17 on/in a display area 18 of at least one message of timepiece 100. In this context, and as we have mentioned earlier, such an man-machine interface MMI comprises processing unit 5a of electronic device 3a, which is in particular capable of generating the visual representation of information data 13 coming from server 2, display module 7a for displaying the visual representation of information data 13, selection interface 8a through which the first user of electronic device 3a can act, as well as light and audio stream capture modules 14a, 14b, 11a, 11b which participate in creating the digital graphic representation for transmission 12. Note that in this embodiment of the invention, the visual representation of information data 13 comes from, in particular, a data stream of Web application content and data coming from server 2. Here, the content data such as digital visual representation models 10 and the descriptive parameters, are included in digital multimedia files stored in database 4 of server 2. As these are web application data, they make it possible to participate in the manipulation of content data in the present case by means of a web navigation tool capable of comprising a display extension module of a 2D or 3D digital visual representation model 10 of the "WebGL" type of man-machine interface MMI. Here, it is understood that the content and web application data are stored in database 4 of server 2.

As we have mentioned earlier, database 4 of server 2 stores content data, such as the plurality of digital visual representation models 10, of which one of the latter can be selected in advance so as to be modified in order to obtain the digital graphic representation for transmission 12 capable of being reproduced on/in display area 18 of timepiece 100 in particular from building device 6.

Such a building device 6 shown in FIG. 1 comprises:

a material removal unit, and/or a material deposition unit, a fixing unit, and a drive unit.

In this context, the material removal unit preferably comprises a machining component operating according to the various machining techniques known from the prior art in order to make a two-dimensional (2D) or three-dimensional (3D) figurative representation 17.

In this building device 6, the material deposition unit can make it possible to apply material to display area 18 of component 20 of timepiece 100, preferably by printing, in order to make two-dimensional (2D) or three-dimensional (3D) figurative representation 17. In this context, such a deposition unit comprises a plurality of printing entities, particularly material jet printing cartridges, particularly ink jet printing cartridges. In the present embodiment, each cartridge comprises at least one print head and at least one tank. In these cartridges, the material can be coloured while comprising a coloured ink including pigmented particles, and/or have functional properties. Such functional properties may relate to physical and/or chemical functional characteristics of this material which are associated with, for example:

electroluminescence, photoluminescence (for example, a reaction with ultra-violet radiation);

phosphorescence,

"X-chromism" (photochromism, electrochromism, thermochromism, ionochromism, mechanochromism, etc.), etc.

In this building device 6, the drive unit is capable of causing the material deposition unit and/or the material removal unit to move in various directions in relation to at least one component 20 of timepiece 100 capable of comprising display area 18 on which figurative representation 17 is to be made. Indeed, this display area 18 can be defined on a single component 20 of this timepiece 100, for example the dial, or on a plurality of components 20 such as the collar and the dial. Note that display area 18 is preferably defined on all or a portion of said at least one component 20 that is visible when timepiece 100 is worn by the second user, who is here the wearer of said timepiece 100. In the present embodiment, this display area 18 is defined, for example, on a portion of a visible surface of the dial.

As for the fixing unit, it is provided to ensure the fixing of at least one layer of material on this display area 18, or on a first layer or initial layer of material already present on this area 18. This fixing unit comprises a module capable of emitting an ultraviolet (UV) and/or infrared radiation and/or an air flow, particularly a hot air flow. This module is capable of generating a radiation or an air flow on all or a portion of display area 18.

In addition, note that system 1 comprises a support element 16 designed to receive said at least one component 20 of timepiece 100 capable of comprising display area 18 in anticipation of the deposition or removal of material.

Figure 2:
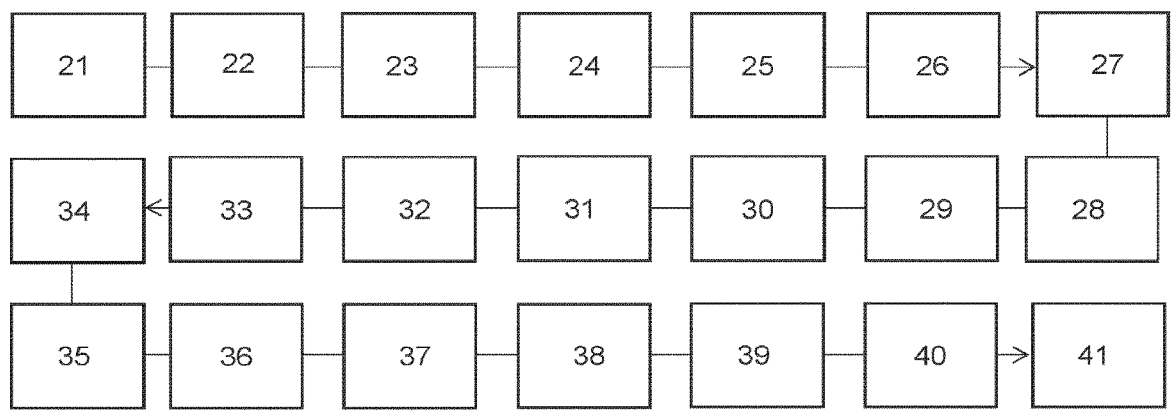
FIG. 2 is a logic diagram of a method for transmitting said at least one message between the first electronic device of the first user and the second electronic device of the second user by means of the timepiece, according to the embodiment of the invention.

In reference to FIG. 2, this system 1 implements a method for transmitting at least one message by means of timepiece 100.

Such a method comprises a creation step 21 for creating the message to be sent by first electronic device 3a of the first user. This step 21 implemented by first device 3a comprises a generation sub-step 22 for generating digital message data from the processing, for example from capturing:
- an audio stream corresponding to an audio message that is recorded by means of at least one audio stream capture module 11a and processing unit 5a of first electronic device 3a;
- a light stream corresponding to a two-dimensional or three-dimensional photographic message, or a two-dimensional or three-dimensional graphic message recorded by means of at least one light stream capture module 14a and processing unit 5a of first electronic device 3a;
- a light stream corresponding to a two-dimensional or three-dimensional video message recorded by means of at least one light stream capture module 14a and processing unit 5a of first electronic device 3a, or
- simultaneous audio and light streams corresponding to an audio-visual message that are recorded by means of light stream module 14a and audio stream module 11a, as well as processing unit 5a of first electronic device 3a.

In this context, the audio and/or video streams are thus captured by first electronic device 3a capable of being controlled/managed by the first user and this with the aim of defining the type and content of the message that the first user intends to transmit to the second user.

Next, the method comprises a storage step 23 for storing said created message on a remote server and/or in said first electronic device (3a) in the form of digital message data. These digital message data are included in a digital file stored in database 4 of server 2.

The method then calls for a generation step 24 in which remote server 2 and/or said first electronic device 3a generates a digital graphic representation for transmission of said message. This digital graphic representation for transmission 12, otherwise referred to as a reference digital graphic representation, participates in the transmission of the message on second electronic device 3b, as we shall see below, by being shown on timepiece 100 in the form of a figurative representation 17. Such a step 24 calls for, in particular, the generation of this digital graphic representation for transmission 12 which constitutes an identifier of the message to be sent, because such a graphic representation 12 is unique here or substantially unique.

Such a generation step 24 comprises a selection sub-step 25 for selecting, through a man-machine interface MMI of first electronic device 3a, a digital visual representation model 10 chosen from among various models 10 displayed on display module 7a of this first electronic device 3a. This step 24 also comprises a production sub-step 26 for producing data specific to said digital message data. During this sub-step 26, processing performed by processing unit 5a of first electronic device 3a and/or by control unit 9 of server 2, is then applied to these digital message data in order to identify the specific data included in these digital message data. When the digital message data come from audio and/or video messages, or photographic messages having content comprising biometric characteristics pertaining to the first user, for example the voice and/or physical, physiological, or behavioural traits of the first user, then the processing applied to these digital data makes it possible to identify these specific data comprising these biometric characteristics.

This step 24 then comprises a conversion sub-step 27 in which these specific data are converted by processing unit 5a and/or control unit 9 into criteria for modifying/coding selected digital visual representation model 10. Such modification criteria are defined so as to modify at least one descriptive parameter of selected digital visual representation model 10, the digital message data during an application sub-step 28 for applying these modification criteria to at least one descriptive parameter of said digital visual representation model 10. Such an application sub-step 28 of generation step 24 implemented by processing unit 5a and/or control unit 9 then makes it possible to vary, for example, the shape of the two-dimensional and/or three-dimensional graphic object or objects constituting this digital visual representation model 10, the dimensions of this graphic object or of these graphic objects, the colour or colours thereof, the texture or textures thereof, and/or the relative positions thereof when this digital graphic representation 10 comprises a plurality of these objects. Thus, this digital visual representation model 10, by comprising at least one modified descriptive parameter, then constitutes digital graphic representation for transmission 12.

This digital graphic representation for transmission 12 thus generated, which comprises the identifier of the message, is then stored, during the performance of storage step 29, in database 4 of server 2 and/or in the memory components of processing unit 5a of first electronic device 3a. This digital graphic representation for transmission 12 is associated with the corresponding digital message data in database 4.

Next, the method comprises a building step 30 on all or a portion of timepiece 100 by the visual element building device controlled by server 2, for building a figurative representation corresponding to said digital graphic representation for the transmission of said message. More specifically, this step 30 comprises an arrangement sub-step 31 for arranging at least one component 20 of timepiece 100 comprising display area 18 of the message on support element 16 of system 1 in anticipation of the generation of figurative representation 17 pertaining to digital graphic representation for transmission 12 comprising the identifier of the message on this display area 18.

Building step 30 then comprises a determination sub-step 32 for determining descriptive characteristics of digital graphic representation for transmission 12. During this sub-step 32, the determined descriptive characteristics comprise, for example:
- at least one dimension of this digital graphic representation for transmission 12, which may be, for example, a thickness, a length, a width, a surface, a volume, etc.;
- visual/aesthetic/structural aspects, that is, visual and/or aesthetic and/or structural aspects of digital graphic representation for transmission 12 such as the colour and/or texture, etc.
- physical and/or chemical functional characteristics of digital graphic representation for transmission 12, such as, for example:
  electroluminescence;
  photoluminescence (for example, a reaction to ultra-violet radiation);
  phosphorescence;
  "X-chromism" (photochromism, electrochromism, thermochromism, ionochromism, mechanochromism, etc.);
  etc.

The descriptive characteristics thus determined are then stored in database 4 of server 2.

Building step 30 then comprises a generation sub-step 33 for generating at least one control instruction to control building device 6 as a function of the descriptive characteristics of said digital graphic representation for transmission 12, by sever 2 and particularly by control unit 9 thereof. This said at least one instruction comprises criteria for reproducing digital graphic representation for transmission 12 on/in display area 18 of timepiece 100, particularly criteria for controlling building device 6.

This step 30 then calls for a building sub-step 34 for building figurative representation 17 of the message on display area 18. Such a building sub-step 34 can call for the implementation of:
- a process of material removal by building device 6 in display area 18 as a function of said at least one control instruction, or
- a deposition process for depositing at least one layer of material on display area 18 as a function of said at least one control instruction.

During this material removal process, building device 6, namely the material removal unit preferably comprising a machining component, is then controlled by control unit 9 of server 2 according to said at least one control instruction comprising the performance criteria such as:
- a movement of the removal unit in relation to display area 18 in order to reproduce the characteristics of the visual/aesthetic/structural and/or functional aspects of at least one dimension of digital graphic representation for transmission 12;
- a distance and/or positioning of the removal unit in relation to display area 18 in order to reproduce the characteristics of the visual/aesthetic/structural and/or functional aspects of at least one dimension of digital graphic representation for transmission 12;
- a positioning duration of the removal unit in relation to display area 18 in order to reproduce the characteristics of the visual/aesthetic/structural and/or functional aspects of at least one dimension of digital graphic representation for transmission 12.

During the material deposition process, building device 6, namely of the printing device and the fixing unit, is then controlled by control unit 9 of server 2 according to said at least one control instruction comprising the performance criteria such as:
- a selection of the cartridges comprising the print heads needed to reproduce the digital graphic representation in display area 18, and this according to the material they contain, in particular for reproduction of the characteristics pertaining to the visual/aesthetic/structural and/or functional aspects of digital graphic representation for transmission 12;
- a movement of the print head of each cartridge in relation to display area in order to reproduce the characteristics of the visual/aesthetic/structural and/or functional aspects of at least one dimension of digital graphic representation for transmission 12;
- a distance and/or positioning of the print head of each cartridge in relation to display area 18 in order to reproduce the characteristics of the visual/aesthetic/structural and/or functional aspects of at least one dimension of digital graphic representation for transmission 12;
- a positioning duration of the print head of each cartridge in relation to display area 18 in order to reproduce the characteristics of the visual/aesthetic/structural and/or functional aspects of at least one dimension of digital graphic representation for transmission 12;
- a flow of material ejected from the print heads in order to reproduce the characteristics of the visual/aesthetic/structural and/or functional aspects of at least one dimension of digital graphic representation for transmission 12.

Next, this method comprises a removal step 35 for removing support element 16 from system 1 of said at least one component 20 of timepiece 100, now provided with figurative representation 17 comprising the identifier of the message, before being directed toward an assembly line of timepiece 100. Note that because figurative representation 17 pertains to digital graphic representation for transmission 12 comprising the message identifier, this figurative representation 17 therefore comprises or constitutes said message identifier.

The method then comprises a building step 36 for building timepiece 100. Such a step 36 comprises an assembly sub-step 37 for assembling all components 20 constituting said timepiece 100, to which belongs said at least one component 20 comprising display area 18 provided with figurative representation 17 comprising the message identifier.

Next, the method comprises a transmission step 38 for transmitting said message by second electronic device 3b of the second user from a digital figurative representation 19 emanating from the capture of the figurative representation included on all or a portion of timepiece 100 by this second electronic device 3b. During this step 38, such a message is then transmitted to the second user by means of display module 7b and/or the transmission interface for transmitting audio information. This step 38 comprises a digitization sub-step 39 for digitizing figurative representation 17 made in display area 18 from second electronic device 3b in order to obtain digital figurative representation 19, also called digitized graphic/visual representation of figurative representation 17. Note that such a digitization/scanning may be in three dimensions if second electronic device 3b is equipped with a digitization module 15b preferably comprising at least two light stream capture modules 14b. While this sub-step 39 is being performed, man-machine interface MMI of this second electronic device 3b comprising processing unit 5b, display module 7b, light and audio stream capture modules 14b, 11b, and selection interface 8b may be used to improve the digitization of this figurative representation 17. This digitization of figurative representation 17 therefore participates in the generation of digital figurative representation 19 by second electronic device 3b, such a digital figurative representation 19 comprising the message identifier since figurative representation 17 from which it emanates has been built from digital graphic representation for transmission 12. This step 38 then comprises an identification sub-step 40 for identifying the message to be sent. During such an identification sub-step 40, processing unit 5b of this second electronic device 3b and/or control unit 9 of server 2 implements, for example, a digital processing of the image aimed at making a comparison between digital figurative representation 19 and digital graphic representation for transmission 12, in order to identify in the database, for example, the digital data pertaining to the message to be sent associated with this message identifier, that is, in the present case, digital graphic representation for transmission 12.

Next, this transmission step 38 comprises a transmission sub-step 41 for transmitting digital data on said identified message to second electronic device 3b. During this sub-step 41, such digital data which are preferably included in database 4 of server 2 and which pertain to the message to be sent, are transmitted from database 4 to this second electronic device 3b once control unit 9 of server 2 has received a request comprising the message identifier. Note that such a transmission step 38 may require an identification of the second user before transmission of the message.

One can observe that during these data exchanges between first and second electronic devices 3a, 3b with server 2, the method preferably calls for the establishment of a secure link between these first and second electronic devices 3a, 3b and server 2 by means of the interface and the communication module.

The invention also relates to a computer programme comprising programme code instructions for executing steps 21 to 41 of this method when said programme is executed by control unit 9 and processing units 5a, 5b of server 2, and first and second electronic devices 3a, 3b, respectively.

The invention claimed is:

1. A method for transmitting a message between a first electronic device of a first user and a second electronic device of a second user via a timepiece, the method comprising:
    creating the message to be transmitted, by the first electronic device of the first user;
    storing said created message on at least one of a remote server and the first electronic device in a form of digital message data;
    generating a digital graphic representation of said message, by the at least one of the remote server and the first electronic device;
    building a figurative representation pertaining to said digital graphic representation of said message on a portion of the timepiece, by a visual element building device controlled by the remote server; and
    transmitting said message, to the second electronic device of the second user, by obtaining a digital figurative representation of the message by capturing, by the second electronic device, the figurative representation included on the portion of the timepiece.

2. The method according to claim 1, wherein the generating step is performed by the first electronic device and further comprises selecting, through a man-machine interface of the first electronic device, a digital visual representation model from among various models displayed on a display of the first electronic device.

3. The method according to claim 2, wherein the generating step further comprises applying modification criteria to at least one descriptive parameter of the selected digital visual representation model.

4. The method according to claim 1, wherein the transmitting step further comprises digitizing, by the second electronic device, the figurative representation made on a display area of the timepiece.

5. The method according to claim 4, wherein the transmitting step further comprises identifying the message to be transmitted.

6. The method according to claim 5, wherein the transmitting step further comprises transmitting the digital message data pertaining to said identified message to the second electronic device.

7. The method according to claim 1, wherein the building step further comprises generating at least one instruction to control a building device to build the figurative representation, as a function of the descriptive characteristics of the digital graphic representation, via control circuitry of the remote server.

8. The method according to claim 1, wherein the building step further comprises building the figurative representation on a display area by implementing (1) a process of material removal in the display area, (2) a process of depositing at least one layer of material on the display area, or (3) the process of the material removal followed by the process of the depositing.

9. The method according to claim 1, further comprising building the timepiece by assembling a set of components constituting said timepiece to which at least one component comprising a display area provided with the figurative representation belongs.

10. The method according to claim 1, wherein a display area is defined on a single component of the timepiece, or on a plurality of components separate from the timepiece.

11. The method according to claim 10, wherein the single component of the timepiece is a dial of the timepiece.

12. The method according to claim 1, wherein the message is an audio message, a video message, or a graphical message.

13. The method according to claim 1, wherein the figurative representation is two-dimensional or three-dimensional.

14. A system for transmitting the message between the first electronic device of the first user and the second electronic device of the second user via the timepiece, by implementing the method according to claim 1, the system comprising:
    the first and second electronic devices;
    the remote server including a database provided with at least one digital graphic representation model; and
    a building device configured to build visual elements of the message on a display area defined on the portion of the timepiece, the first and second electronic devices and the building device being connected to the remote server.

15. The timepiece included in the system according to claim 14, wherein the timepiece includes the display area, provided with the figurative representation comprising an identifier of the message.

16. A non-transitory computer readable medium storing a program that, when executed, performs the method according to claim 1, wherein the program is executed by control and processing circuitry of the remote server and of the first and second electronic devices.

* * * * *